United States Patent [19]

Hatanaka

[11] Patent Number: 4,802,039
[45] Date of Patent: Jan. 31, 1989

[54] TAPE PLAYER
[75] Inventor: Ryousuke Hatanaka, Sayamashi, Japan
[73] Assignee: Nihon Technical Kabushiki Kaisha, Tokyo, Japan
[21] Appl. No.: 11,057
[22] Filed: Feb. 5, 1987
[51] Int. Cl.$^4$ ............................................. G11B 15/32
[52] U.S. Cl. ...................................... 360/96.5; 360/93
[58] Field of Search ..................... 360/96.5, 96.1–96.4, 360/96.6, 93, 95, 137; 242/197, 198, 199

[56] References Cited
U.S. PATENT DOCUMENTS
4,642,714 2/1987 Miyamoto ........................ 360/96.5

Primary Examiner—John H. Wolff
Attorney, Agent, or Firm—Bruce L. Adams; Van C. Wilks

[57] ABSTRACT

A tape player according to the present invention has a pivotal lever which is pivotally moved horizontally, when a tape cassette is loaded, from its ejection position to its loading position, the pivotal lever having a member engaged with a reel hole when a cassette is loaded connected to one end thereof, a pivotal member pivotally mounted horizontally pivotably having an operatively connecting member formed to be precluded from pivotal movement outside an instrument frame by used of an ejecting member in a non-lay state and adapted to control a spacing between opposite ends a torsion coil spring opposite ends of which are engaged by the pivotal lever and the pivotal member, respectively, further comprising an actuating member allowing pivotal movement of the pivotal lever when the latter is pivotally moved from the ejection position to the loading position and causing the pivotal lever to be pivotally moved from the loading position to the ejection position along with the operation of the ejecting member, a slidable retaining member for retaining a cassette holder in the non-play state provided with a mechanism by which the cassette holder loaded in the cassette is shifted from the non-play state occupying the upper stage position to the play state occupying the lower stage position, and a defining member provided on the retaining member, the defining member being engaged with the actuating member when the pivotal lever is in the ejection position to restrain sliding movement of the retaining member while allowing the sliding movement of the retaining member when in the loading position to release the retaining state of the cassette holder, characterized in that when the ejecting member is operated, the preclusion of pivotal movement of the pivotal member is released to return the cassette holder from the lower stage position to the upper stage position.

2 Claims, 14 Drawing Sheets

FRONT

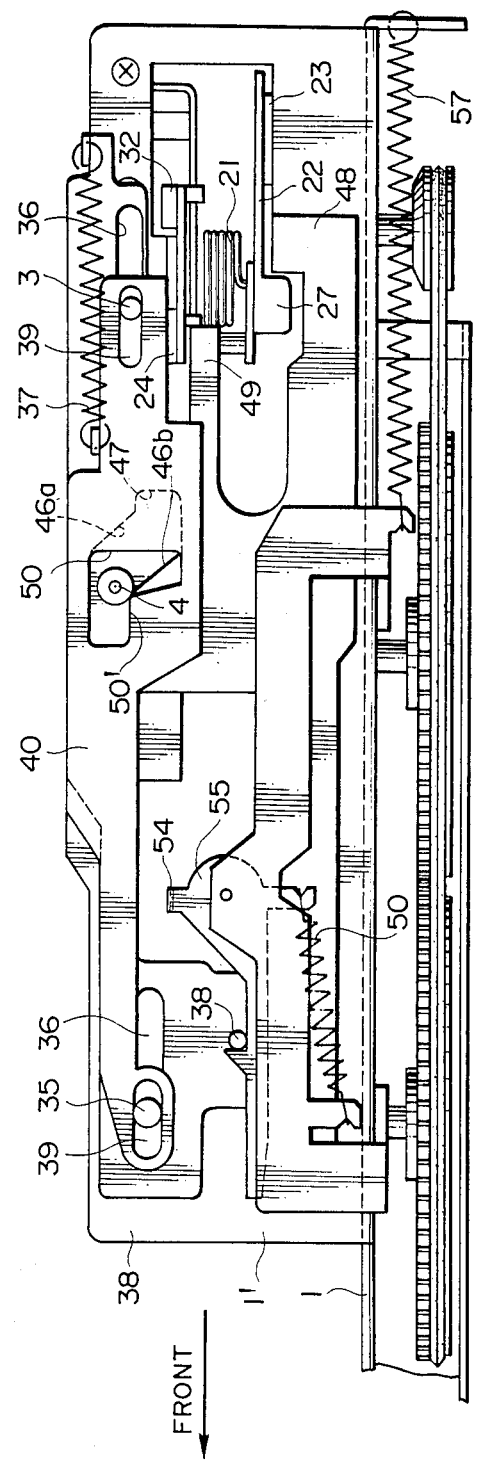

TAPE PLAYER

FIELD AND BACKGROUND OF THE INVENTION

The present invention particularly relates to a tape player suitable for use with a vehicle.

There has been heretofore well known, from Japanese Utility Model Application Laid-Open No. 56-21870, a cassette access mechanism in a tape player in which a torsion coil spring is used, and loading of a cassette is made positively and easily by making use of a repulsive spring force of the torsion coil spring.

However the aforementioned structure of said application has disadvantages such that the mechanism is complicated; since the torsion coil spring is disposed above a cassette housing, the thickness of the tape player increases; and since one end of the torsion coil spring is brought into engagement with the cassette housing which moves upward and downward while maintaining its horizontal state while the other end moves into engagement with a housing arm in an inclined state, the engaged portion is disengaged by the upward and downward movement of the cassette housing to incur a malfunction.

SUMMARY OF THE INVENTION

It is therefore an object of the present application to improve the defects as noted above with respect to the prior art and also reduce the possibility of the malfunction caused by external vibration or the like.

According to a first preferred embodiment of the present invention, there is provided a tape player comprising a cassette holder adapted to be shifted by a resilient bias from a non-play state occupying an upper stage position to a play state occupying a lower stage position; a pivotal lever having one end pivotably mounted on an instrumentframe of the player so that when a tape cassette is loaded in said cassette holder, the lever may be pivotally moved from a cassette ejecting position to its loading position; a member mounted on one end of said pivotal lever and adapted to engage a reel hole of the cassette when the latter is loaded; a pivotal member whose outward movement is precluded by an injecting member in the non-play state occupying the upper state position; a torsion coil spring having opposite ends engaged by the free end of said pivotal member and by the other end of said pivotal lever; and a connecting member interposed between said opposite ends of said torsion coil spring to define movement in the direction in which a spacing between opposite ends of said spring is broadened but allow movement in the direction in which said spacing is reduced, whereby when said injecting member is operated, the preclusion of pivotal movement of said pivotal member is released, and said cassette holder is returned from said lower stage position to said upper stage position.

The first embodiment constructed as described above has the following merits: parts are small in number and the structure is simple; since the torsion coil spring is arranged on the side of the frame of the player, the thickness of the tape player is not increased; since all of the pivotal lever, connecting member, torsion coil spring and pivotal member are moved in a horizontal posture, the operation is carried out smoothly and positively.

According to a second embodiment of the present invention, there is provided a tape player comprising, in addition to elements previously described in said first embodiment, an actuating member adapted to be moved from a first position corresponding to the non-play state to a second position corresponding to the play state in response to the pivotal movement of said pivotal lever from the cassette ejecting position to its loading position, said actuating member being rotated and returned from the second position to the first position by operation of said ejecting member, said actuating member pivotally moving the pivotal lever from said cassette loading position to its ejecting position; a slidably retaining member, which is shifted by resilient bias from the non-play state occupying the upper stage position to the play state occupying the lower stage position, for maintaining said cassette holder in said non-play state; and a defining member provided on said retaining member, said defining member restraining sliding movement of said retaining member by engagement with said actuating member when the latter is in the first position corresponding to the non-play state and allowing sliding movement of said retaining member so as to release the holding state of said cassette holder when said actuating member is rotated from the first position to the second position corresponding to the play state, whereby by operation of said ejecting member, the preclusion of rotation of said pivotal member is released, and said cassette holder is returned from said lower stage position to said upper stage position.

The second embodiment constructed as described above has the following merits: since the torsion coil spring is arranged on the side of the frame of the player, the thickness of the taper player is not increased; since all of the pivotal lever, connecting member, torsion coil spring and pivotal member are moved in a horizontal posture, the operation is smoothly carried out; particularly, at the ejecting operation, the actuating member is rotated by the ejecting member to apply cassette ejecting action to the pivotal lever and therefore a strong spring need not be provided for the purpose of ejecting a cassette as heretofore experienced to expect an easy operation accordingly; and in the non-play state, the actuating member is brought into engagement with the retaining member for controlling tilting action of a tilting frame to prevent the retaining member from being moved by external vibration to allow downward tilting of the tiling frame, and therefore no possible malfunction occurs.

BRIEF DESCRIPTION OF THE DRAWINGS

FIG. 1 is a plan view as a whole of the first embodiment.

FIG. 2 is a fragmentary side view showing essential parts of the first embodiment.

FIGS. 3 and 4 are respectively plan views of essential parts during the operation of shifting from a non-play position to a play position.

FIGS. 5 and 6 are respectively plan views during the operation of shifting from a play position to a non-play position.

FIGS. 7 and 15 illustrate a second embodiment.

FIG. 7 is a plan view as a whole of the second embodiment.

FIG. 15 is a right-hand side view of the second embodiment during the shifting from a play state to a non-play state.

DESCRIPTION OF THE PREFERRED EMBODIMENTS

Figure 1:
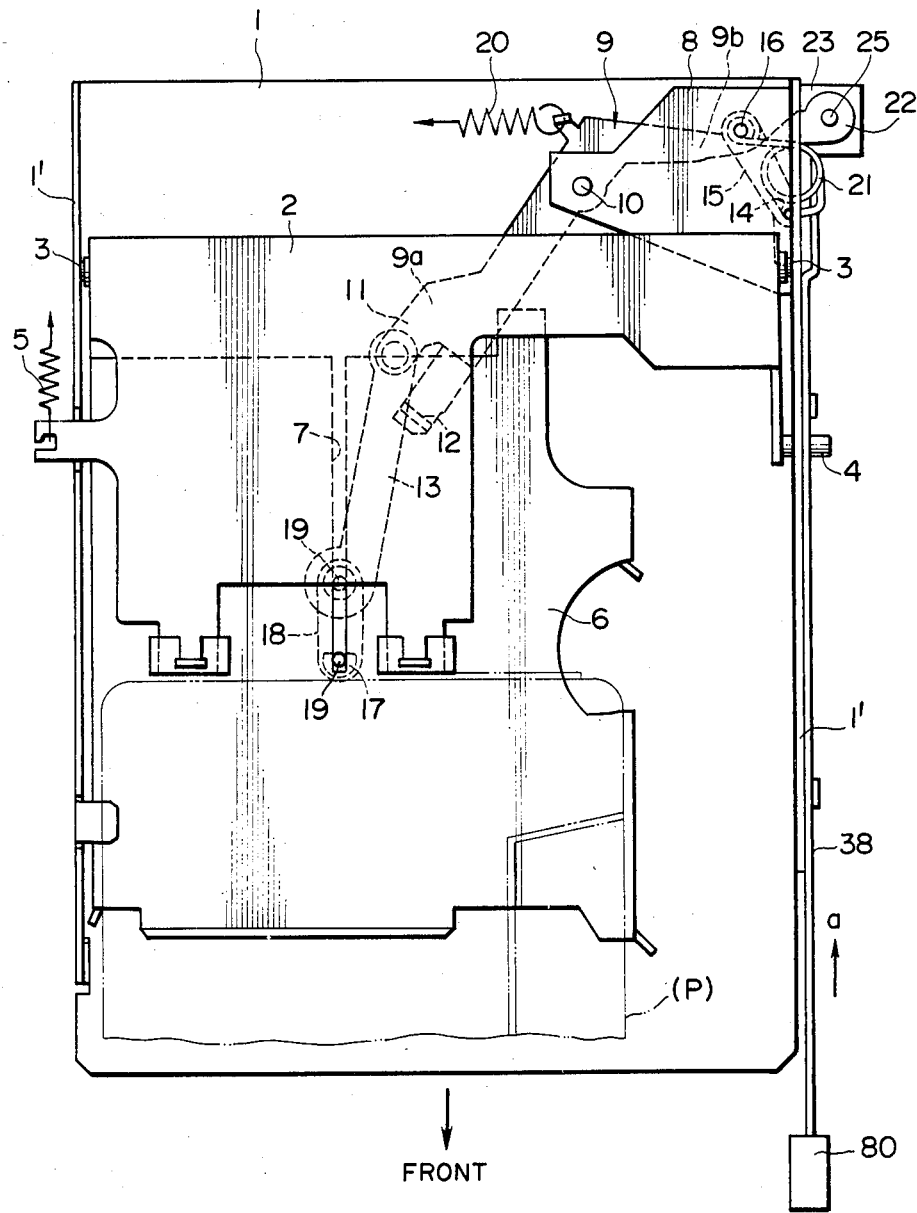
FIGS. 1 to 6 illustrate a first embodiment.

Referring to the drawings, a first embodiment of the present invention will now be described in detail. In these drawings, an inserting inlet side (not shown) of a tape cassette is indicated as a forward portion of a player by an arrow, which constitutes a reference of the forward direction, rearward direction and expressions corresponding thereto. FIG. 1 is a plan view showing essential parts of a tape player provide with a mechanism according to the present application. In a rearward position on an instrumentframe 1, base portions on opposite sides of a tilting frame 2 are mounted tiltably relative to a side wall 1' of the frame by means of support shafts 3. The tilting frame 2 is provided on the front end of one side thereof (right end frontwardly in the drawing) with an operating shaft 4, and on the other side edge provided with an obliquely downwardly extending spring 5. The tilting frame 2 is defined horizontally by means of a first defining portion having substantially the same function as that of a second defining portion which will be later described in detail in connection with a second embodiment, though not shown in FIG. 1, so that when the first defining portion is disengaged from the operation shaft 4, the tilting frame 2 is moved downward and tilted downwardly by the resilient force of the spring 5 to assume a play position. To the free end of the tilting frame 2 is connected a cassette holder 6 positioned on the undersurface thereof and laterally extended so that the cassette holder 6 may be moved upward and downward as the tilting frame 2 tilts, and a laterally extending guide groove 7 is provided in a central position of the first half portion of the cassette holder 6.

On the rear end of a side wall 1' of the frame 1 is provided an inwardly horizontally extending support plate 8, and an intermediate portion of a pivotal lever 9 is horizontally pivotably mounted by a pivot 10 on the lower surface of the end of the support plate 8. This pivotal lever 9 has one piece 9a at the end of which is provided a mounting portion 11 and a contact portion 12, the mounting portion 11 having one end of a connecting member 13 pivotally mounted thereof, and another piece 9b bent relative to said one piece 9a and extending outwardly, on the end of which is pivotally mounted at 16 horizontally rotatably the base end of a connecting member 15 having a slot 14 in the free end thereof.

To the connecting member 13 is connected a member 18 formed from a resilient plate which extends forwardly and is provided on one end with a downwardly directed engaging shaft 17 engageable with a reel hole P' of a cassette P, said member 18 having at its opposite ends upwardly projecting pins 19, respectively, which slidably engage the guide groove 7. A controlling spring 20 for the pivotal lever 9 is provided between the pivotal lever 9 and the frame 1, and a torsion coil spring 21 has one end engaged with a pivot portion 16 between the other pice 9b of the pivotal lever 9 and the connecting member 15, and the other end engaged with a pivotal member 22 later described generally in a non-load state through said slot 14.

One end of a pivotal member 22 is horizontally pivotably mounted at pivot 25 on a support member outwardly provided on the front end of the side wall 1' of the frame 1. The pivotal member 22 extends frontwardly and is put into a punched hole 26 formed in the side wall 1', and a downwardly directed contact member 27 is provided on the outer edge at the frontward end in the figure.

An ejecting lever 38 mounted laterally movably on th side wall 1' of the frame 1 has at the rear end a button 80 and at the foreend an upwardly directed tongue 29 in contact with the outer surface of the contact member 27.

Figure 3:
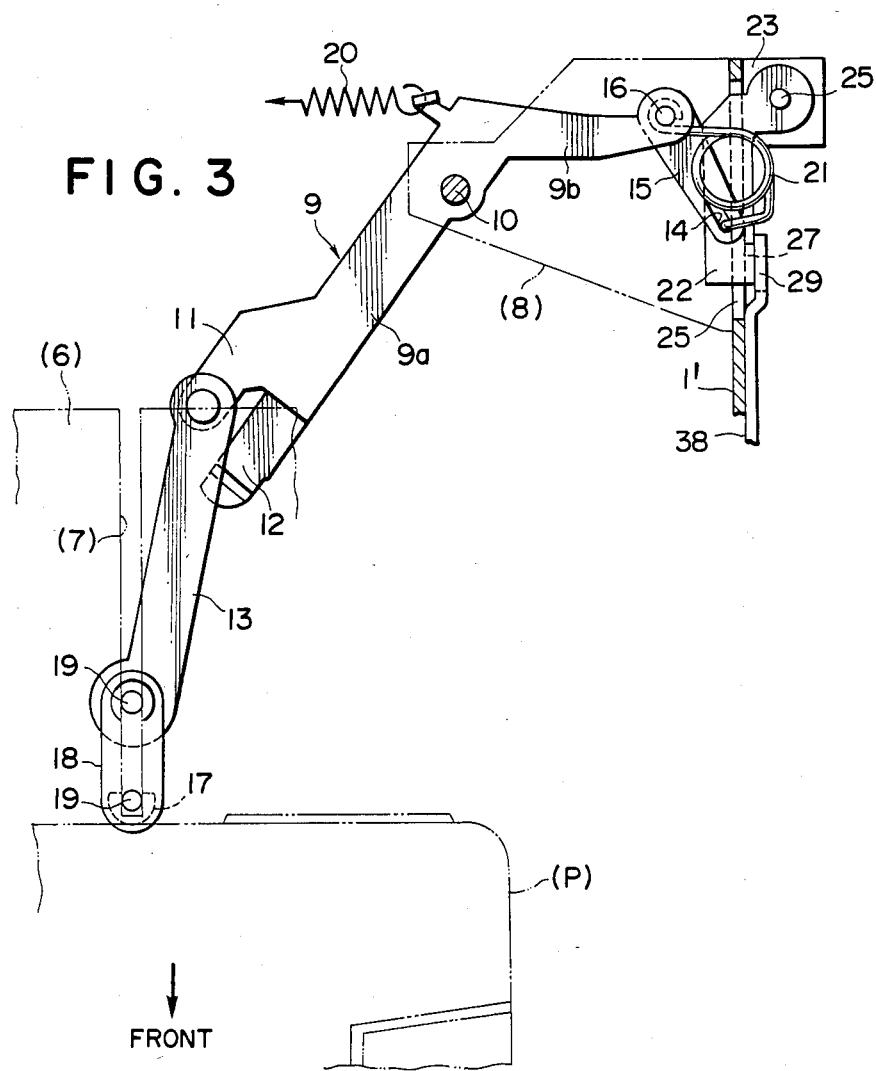

With the above-described arrangement, when the cassette P is inserted into the cassette holder 6 in the non-play state wherein the resilient plate member 18 is positioned in the front end (frontward in the figure) of the guide groove 7, the spacing between the opposite ends of the torsion coil spring 21 is opened in the broadest fashion and the contact member 27 of the pivotal member 22 is in face-to-face contact with the tongue 29 of the ejecting lever 38, as shown in FIGS. 1 and 3, the engaging shaft 17 of the member 18 comes into engagement with the reel hole P' of the cassette P, and the end of the cassette P comes into contact with the contact portion 12 of the pivotal lever 9 during the insertion of the cassette into the cassette holder. Accordingly, as the cassette P is inserted, the member 18 moves rearward while being guided by the guide groove 7, and the pivotal lever 9 is pivotally moved clockwise against the controlling spring 20 about the pivot 10.

Figure 4:
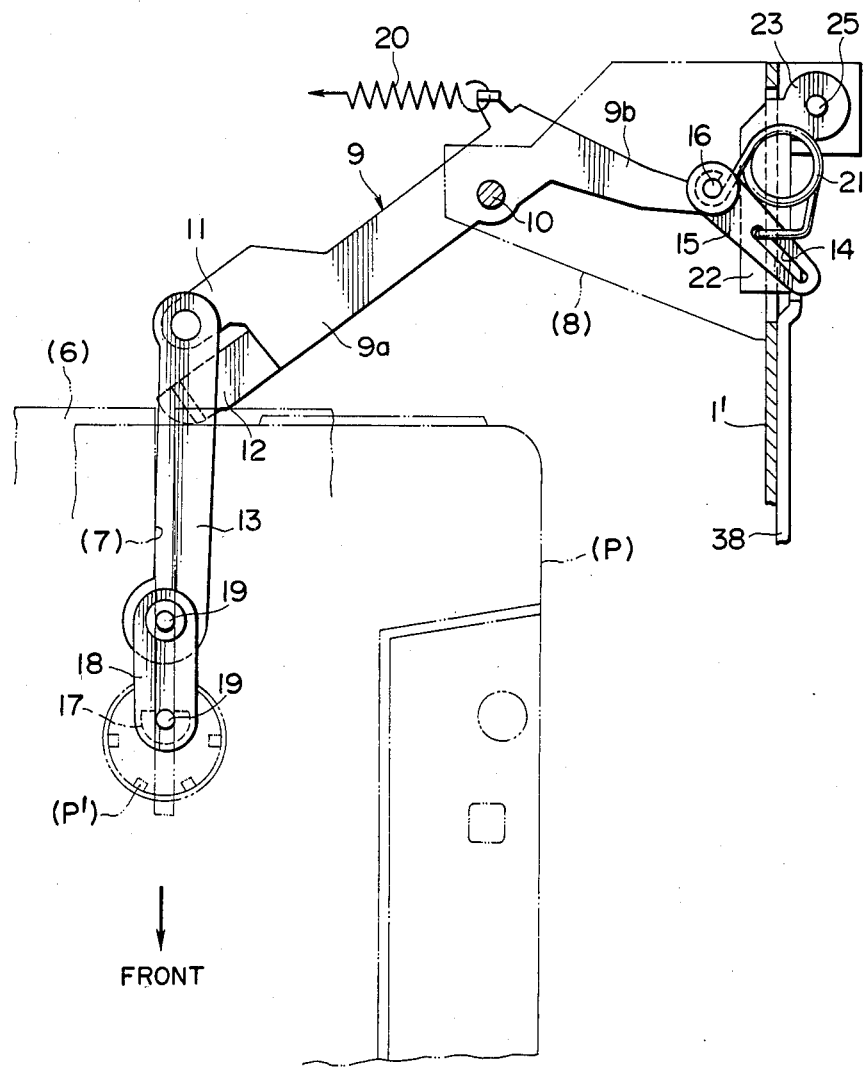
Figure 5:
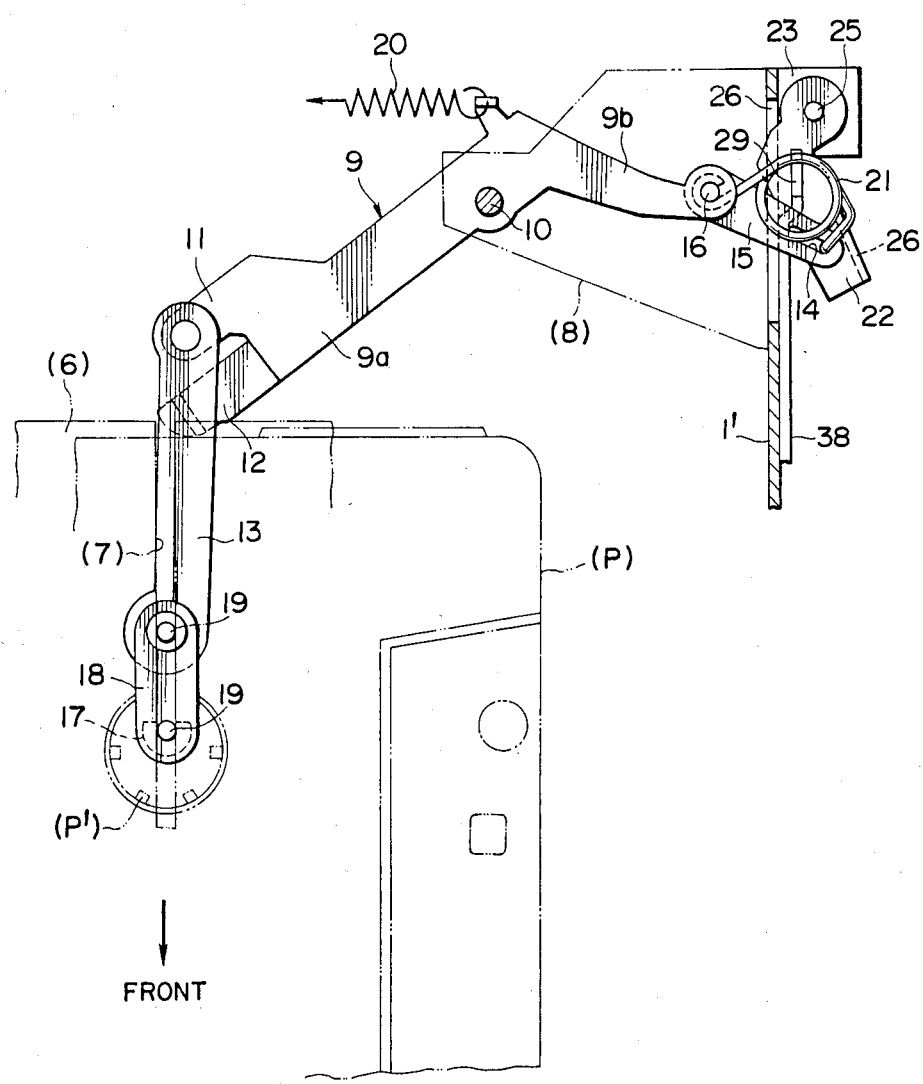

Then, the pivotal movement of the pivotal lever 9 causes the connecting member 15 to be outwardly urged through the engagement between the torsion coil spring 21 and the slot 14, and the opposite ends of the torsion coil spring 21 move close to each other to store a large spring force (FIG. 4).

Figure 6:
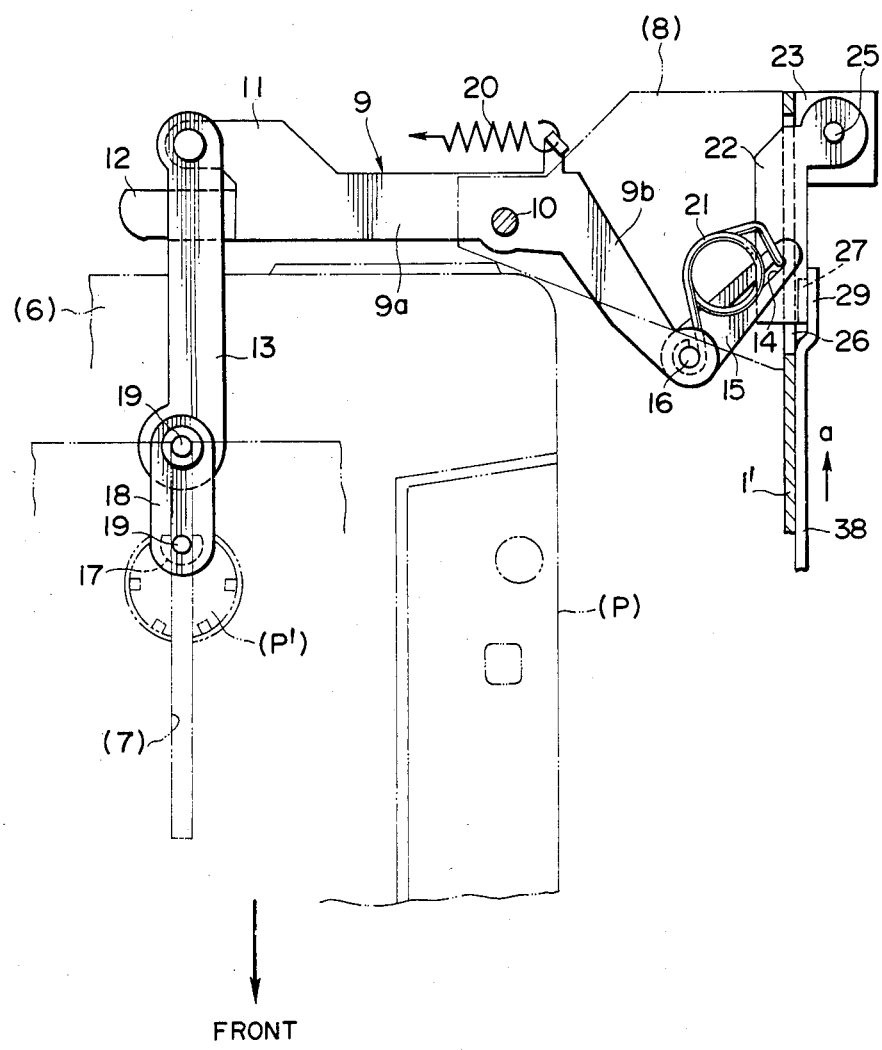

Subsequently, at the moment when as the pivotal lever 9 pivotally moves, the pivot 16 goes beyond a point crossing a line connecting the pivot 10 of the pivot portion 16 and the opposite ends of the torsion coil spring 21, that is, a dead point, the large spring force of the torsion coil spring which has been stored is released whereby the pivotal lever 9 is forcibly pivotally moved clockwise, and the cassette P is drawn backwardly of the cassette holder 6 through the engagement between the reel hole P' and the engaging shaft 17 to load the cassette P in a proper position (FIG. 6).

As previously mentioned, after the cassette P has been loaded in the cassette holder 6, the the first defining member (not shown) is disengaged from the operating shaft 4, and the tilting frame 2 is tilted downwardly. Accordingly, the cassette holder 6 is moved downward, and the player assumes a play state.

Next, the injecting member 38 is urged through the button 80 in the direction as indicated by arrow a in FIG. 6 against the return spring (not shown) in order to eject the P from the play position shown in FIG. 6. Then, the first defining member (not shown) is again functioned whereby the tilting frame 2 is tilted upwardly, and the cassette holder 6 is returned to the upper stage position. At the same time, the contact between the tongue 29 provided on the ejecting member 38 and the contact member 26 provided on the pivotal member 22 is released and the pivotal lever 9 is pivotally moved counterclockwise by the controlling spring 20. At the initial period of the pivotal movement of the pivotal lever 9, the pivotal member 22 is once projected outwardly from the side wall 1' of the frame 1 through the connecting member 15.

Figure 2:
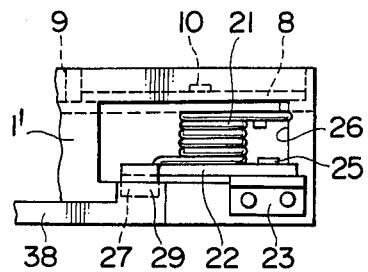

The pivotal lever 9 causes the end of the cassette P to be urged forwardly by the contact portion 12 while being moved counterclockwise by the controlling spring 20. As the pivotal lever 9 pivotally moves counterclockwise, the torsion coil spring 21 connected to the other piece 9b of the lever 9 and the connecting member 15 are respectively drawn into the frame, and the pivotal member 22 pivotally moves clockwise about the pivot portion 25. At this time, the torsion coil spring 21 substantially maintains the non-load state, and the cassette P is ejected frontwardly by the pivotal movement of the pivotal lever 9 caused by the controlling spring 20 to restore the parts to the states shown in FIGS. 1 and 2. While the first defining portion in the aforementioned first embodiment is actuated by manual operation of the ejecting member, it is to be noted that the first defining portion may be replaced by the second defining portion in the second embodiment later described so that the former may be operatively connected to a motordriven ejecting member.

Figure 7:
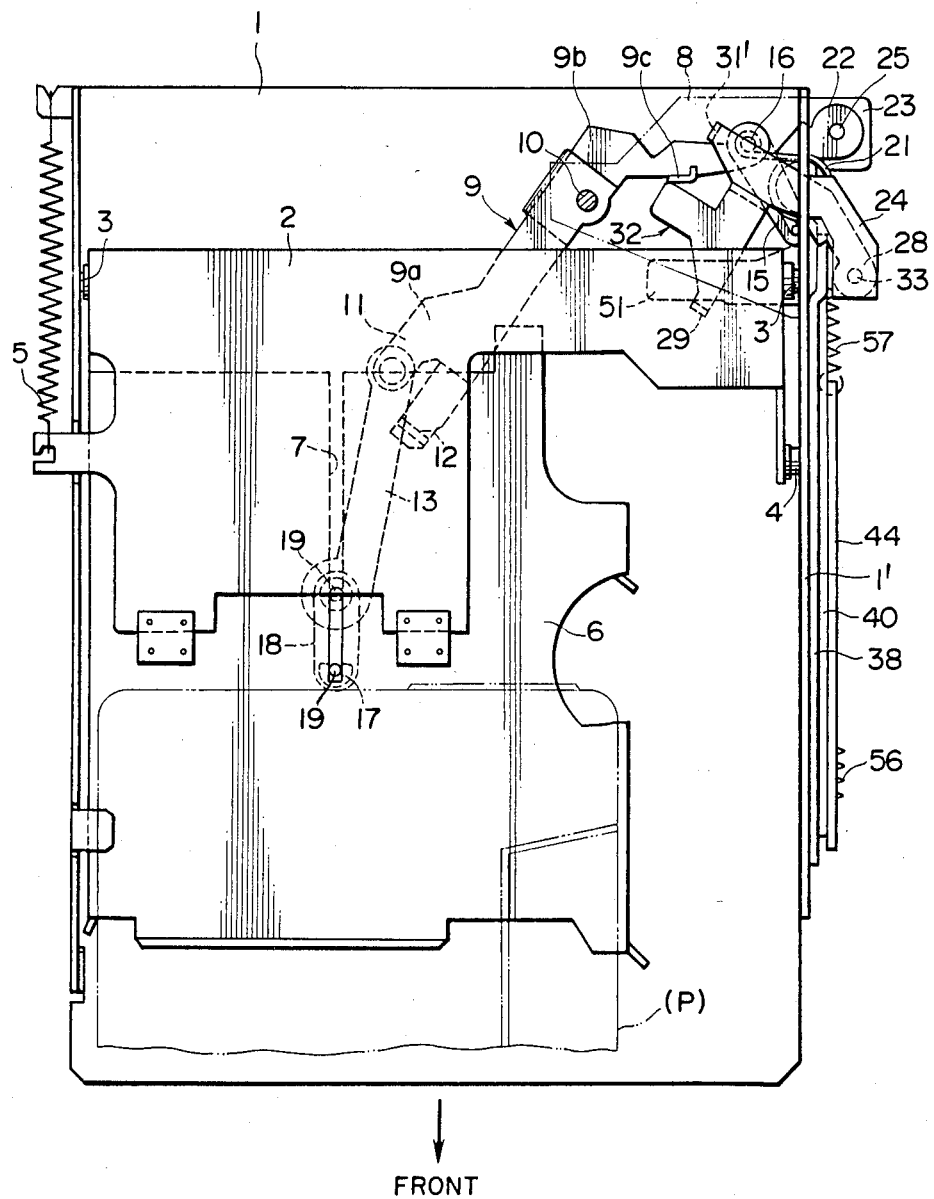

FIG. 7 shows a second embodiment of the present invention, which is significantly different from the aforementioned first embodiment and which will be described hereinafter.

The torsion coil spring 21 adapted to apply a pivotal force to the pivotal lever 9 has one end engaged at the pivot portion 16 between the other piece 9b of the pivotal lever 9 and the connecting member 15, and the other end engaged at the pivotal member 22 in the state wherein the said other end is in contact with the outer end of the slot 14.

Outwardly directed support members 23 and 24 are provided before and behind on the fornt end of the side wall 1' of the frame 1, and one end of the pivotal member 22 is horizontally pivotably mounted by a pivot 25 on the frontwardly positioned support member 23 and extending in the direction of the forward portion of the player, said one end of the pivotal member 22 being positioned in the punched hole 26 formed in the side wall 1'. A downwardly directed contact member 27 is provided on the outer edge of the front side of the pivotal member 22 (see FIGS. 8 and 9). The rearwardly positioned support member 24 is provided with a leg 29 having at one end a mounting member 28 and horizontally extending perpendicularly to the intermediate portion of an actuating member 31 in the shape of a straight line, the leg 29 having in its intermediate portion said mounting member 28 of an actuating member 32 having a projecting member 30 projected in the shape of the letter T pivotably mounted through a pivot 33. Downwardly directed tongues 28', 31' and 29' are provided on foreends of the mounting member 28, the actuating member 31 and the leg 29, respectively.

Figure 9:
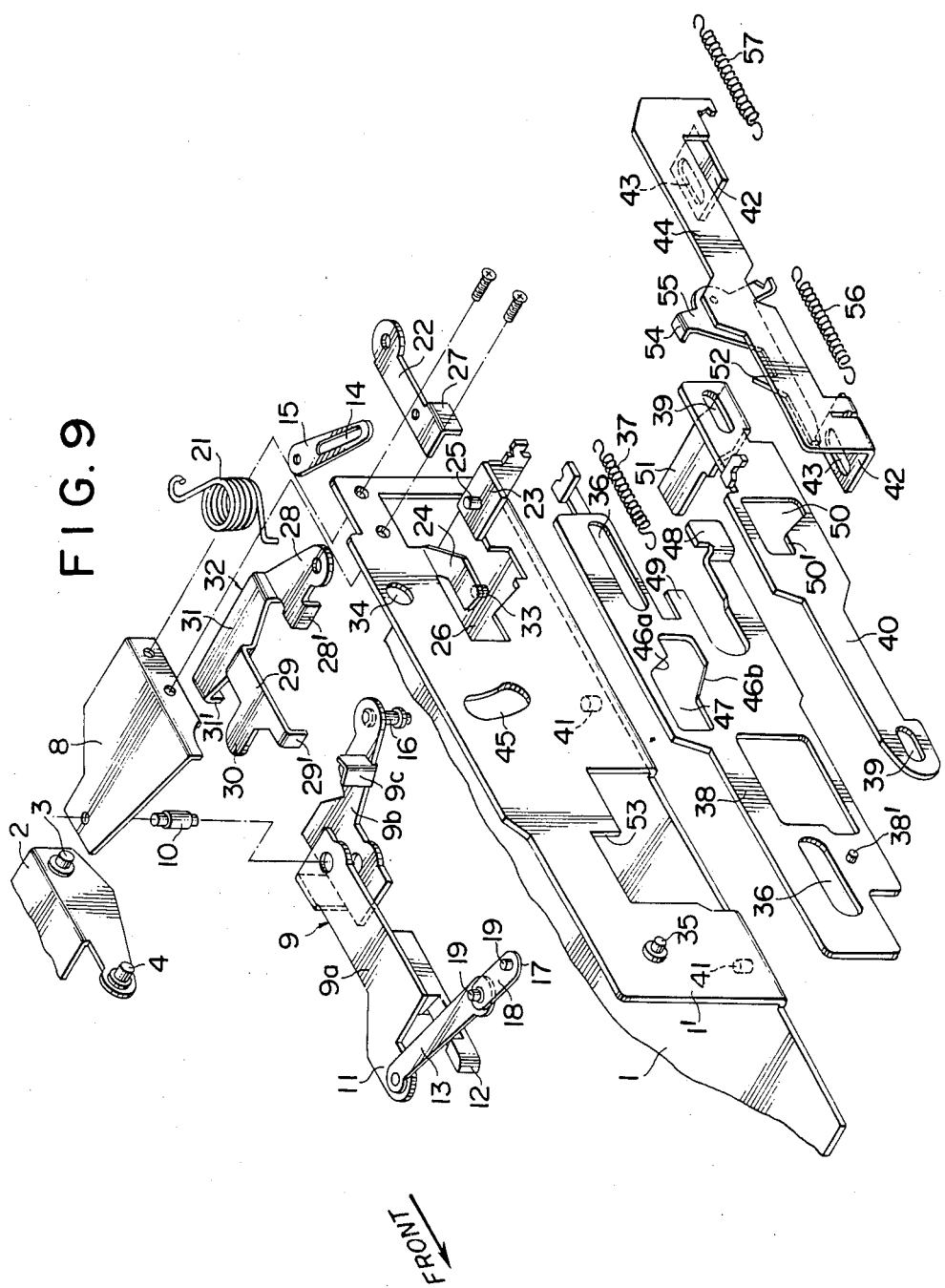
FIG. 9 is an exploded view of essential parts in the second embodiment.

An ejecting member 38 is mounted laterally movably between a rear inoperative position and a front operative position on the outer surface of the side wall 1' of the frame 1 by bringing a slot 36 into engagement with a pin 35 projected from the side wall 1' and the support shaft 3 projected through a hole 34. There are disposed the ejecting member 38 placed in the rear inoperative position by means of a spring 37 in the non-play state, a retaining member 40 positioned on the outer surface of the ejecting member 38 and mounted laterally movably relative to the frame 1 by bringing a slot 39 into engagement with the pin 35 projected from the side wall 1' and the support shaft 3 projected from the tilting frame 2, and a driving member 44 positioned on the outer surface of the retaining member 40 and mounted laterally movably relative to the frame 1 by bringing a slot 43 formed in a bent portion 42 at the lower edge into engagement with a pin 41 projected downwardly on the back of the bottom of the frame 1 (FIG. 9).

The ejecting member 38 is provided with an inclined edge 46a (see FIG. 14) loosely receiving the operating shaft 4 of the tilting frame 2 projected outwardly through an escape hole 45 formed in the side wall 1' of the frame and contacting with the operating shaft 4 to urge it obliquely frontwardly when the ejecting member 38 is at the rear inoperative position, an operating hole 47 having an inclined edge 46b for raising the operating shaft 4 from the play state in the lower stage position to the non-play state in the upper stage position during the movement from the rear inoperative position to the forward inoperative position, a precluding member 48 precluding outward horizontal pivotal movement of the pivotal member 22 in the rear inoperative position but allowing outward horizontal pivotal movement of the pivotal member 22 in the forward operative position, and a forwardly extending projecting member 49.

The retaining member 40 is provided with a downward L-shaped retaining hole 50 loosely receiving the operating shaft 4 and a defining member 51 bended inwardly from the front end of the retaining member 40 and extending in a horizontal direction (see FIG. 9), the retaining member 40 being normally biased in the forward direction corresponding to the ejecting member 38 by means of a spring 37 retained between the retaining member 40 and the ejecting member 38. Accordingly, the operating shaft 4 is maintained in the upper stage position in the state clamped by the horizontal edge 50' of the retaining hole 50 and the downwardly directed inclined edge 46a of the operating hole 47 in the rear inoperative position of the ejecting member 38, and therefore, the cassette holder 6 is also maintained in the non-play state in the upper stage position.

Mounted on the driving member 44 are a vertically rotatable swinging member 55 having at one side end a pawl 52 in engagement with a projection 38' provided on the ejecting member 38 and at the upper end an abutting member 54 in abutment with a contact portion 53 punched in the side wall 1' of the frame, and a controlling spring 56. A strong spring 57 for always urging the driving member 44 rearwardly is retained between the driving member 44 and the side wall 1' of the frame, and the driving member 44 is forwardly drawn against the spring 57 when a motor is driven by a switch actuated when the cassette P is inserted, though not shown, and the driving member 44 is locked at the position of backward movement thereof, the driving member 44 being unlocked at the ejecting operation and moved backward to its original position.

Figure 8:
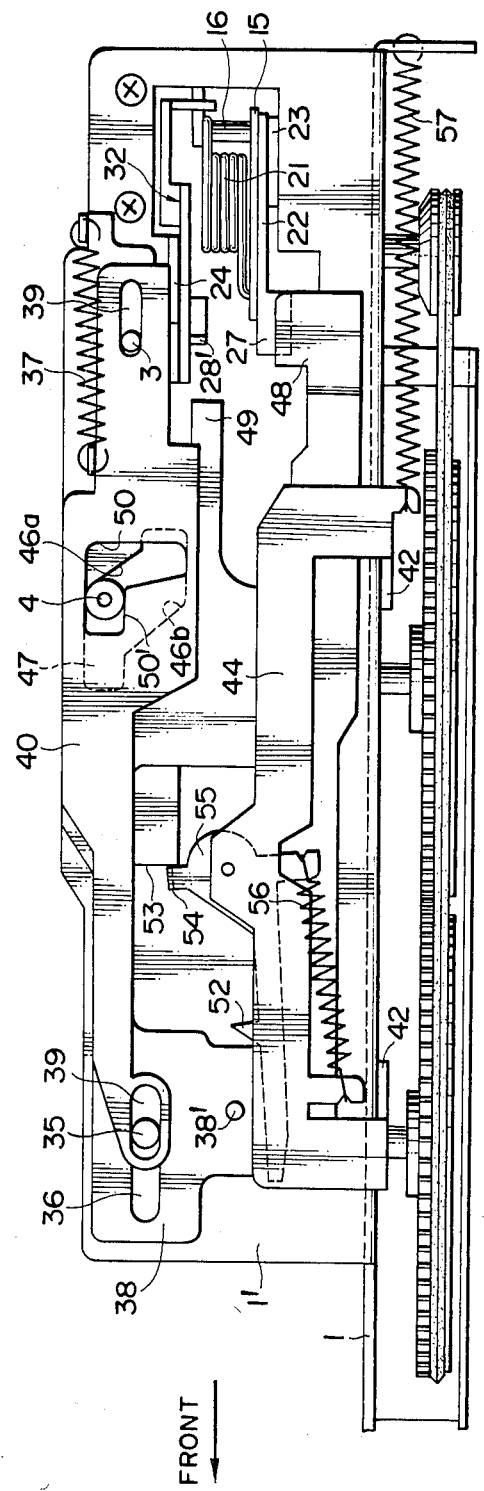
FIG. 8 is a right-hand side view of the second embodiment in the non-play state.
Figure 10:
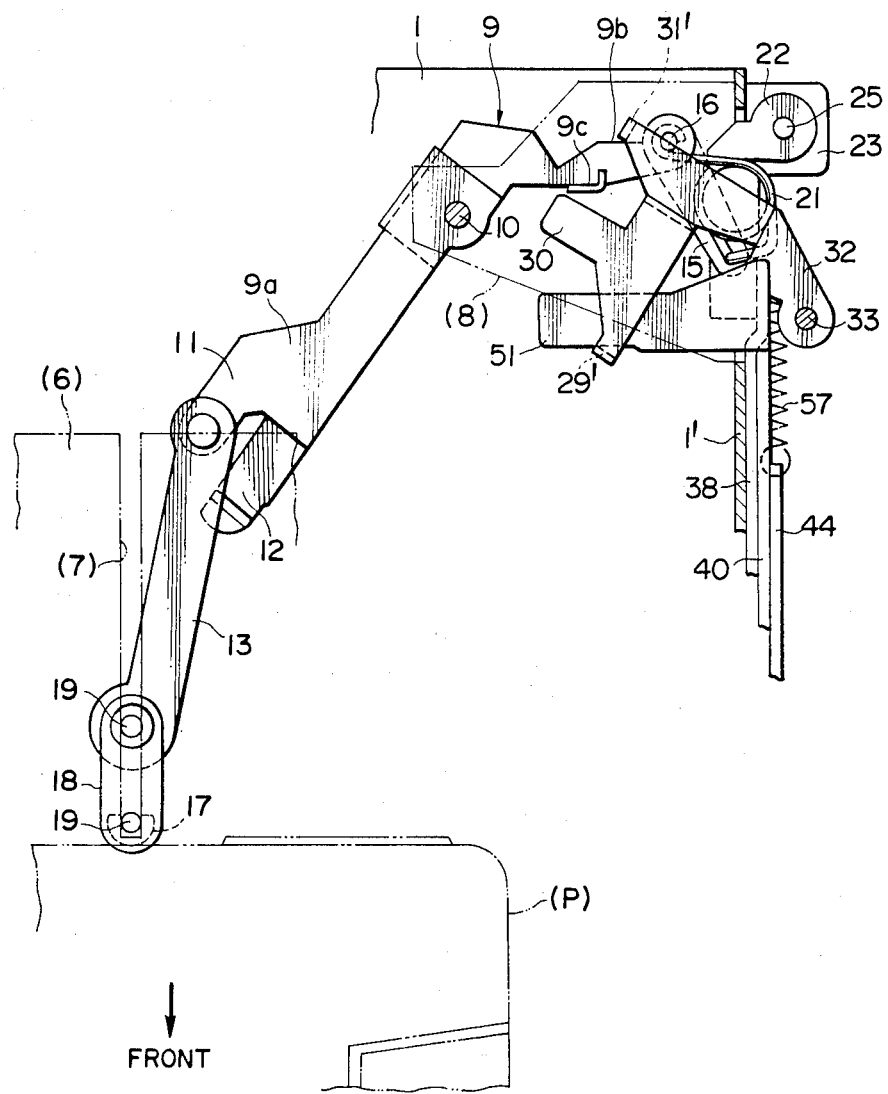
FIG. 10 is a plan view of essential parts in the non-play state.
Figure 12:
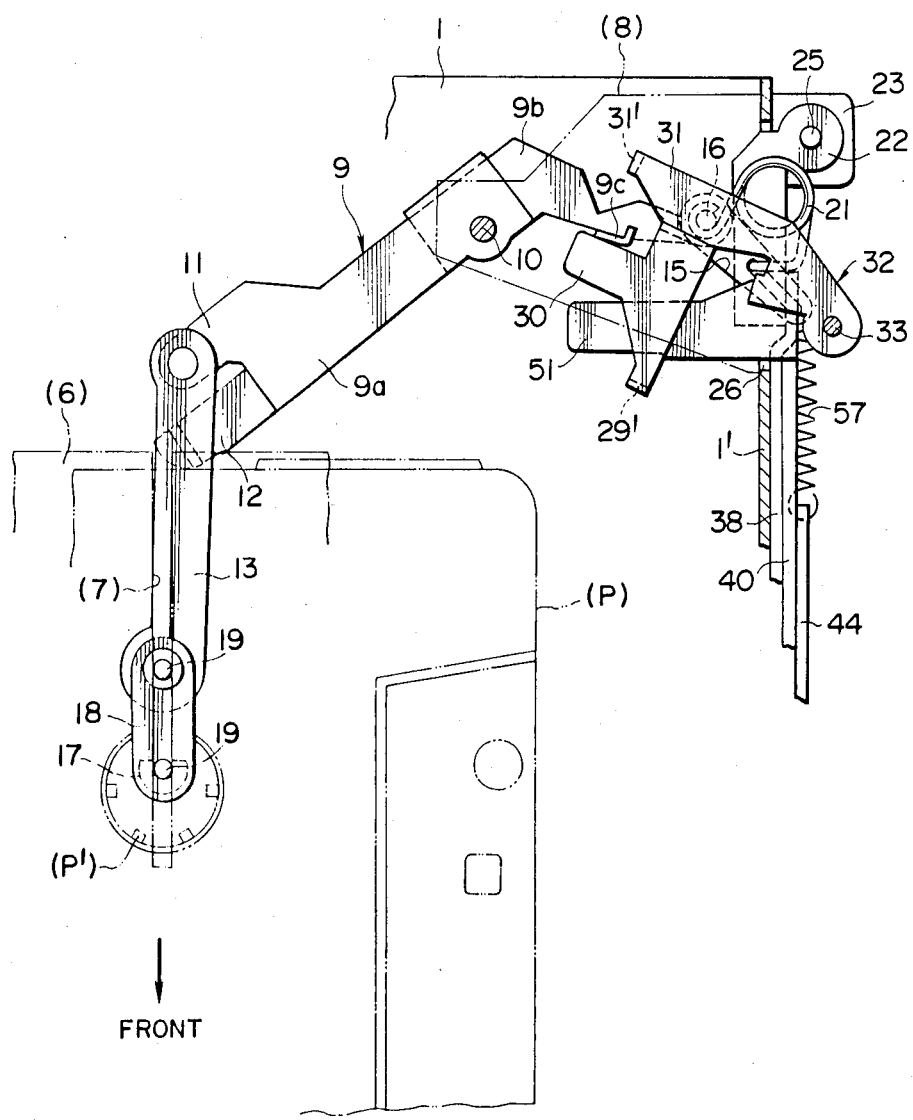
FIGS. 12 and 13 are respectively plan views of essential parts during the operation being varied.

With this arrangement, when the member 18 is positioned at the front end (frontwardly) of the guide groove 7, the opposite ends of the torsion coil spring 21 are most opened, the contact member 27 of the pivotal member 22 is in face-to-face contact with the precluding member 48 of the ejecting member 38, and the cassette P is inserted into the cassette holder 6 from the non-play state occupying the first position in which the actuating member 32 is pivotally moved horizontally clockwise so that the tongue 29' contacts the rear edge of the defining member 52, as shown in FIGS. 7, 8 and 10, the engaging shaft 17 of the member 18 comes into engagement with the reel hole P' of the cassette P and the one end of the cassette P presses the contact portion 12 of the pivotal lever 9, as a consequence of which the member 18 is moved rearwardly while being guided by the guide groove 7 in response to the insertion of the cassette P as shown in FIG. 12, and the pivotal lever 9 is pivotally moved clockwise about the pivot 10 through the connecting member 13.

Then, by the pivotal movement of the lever 9, the torsion coil spring 21 reduces its spacing between the opposite ends thereof to store a large resilient force, and thereafter, when as the pivotal lever 9 pivotally moves, the pivot portion 16 goes beyond a point crossing a line connecting the pivot 10 and the opposite ends of the torsion coil spring 21, that is, a dead point, the pivotal lever 9 is forcefully pivotally moved clockwise forcibly by the release of the stored resilient force, and the cassette P is drawn backwardly of the casset holder through the engagement between the reel hole P' and the engaging shaft 17 whereby the cassette P is automatically loaded in position.

Figure 11:
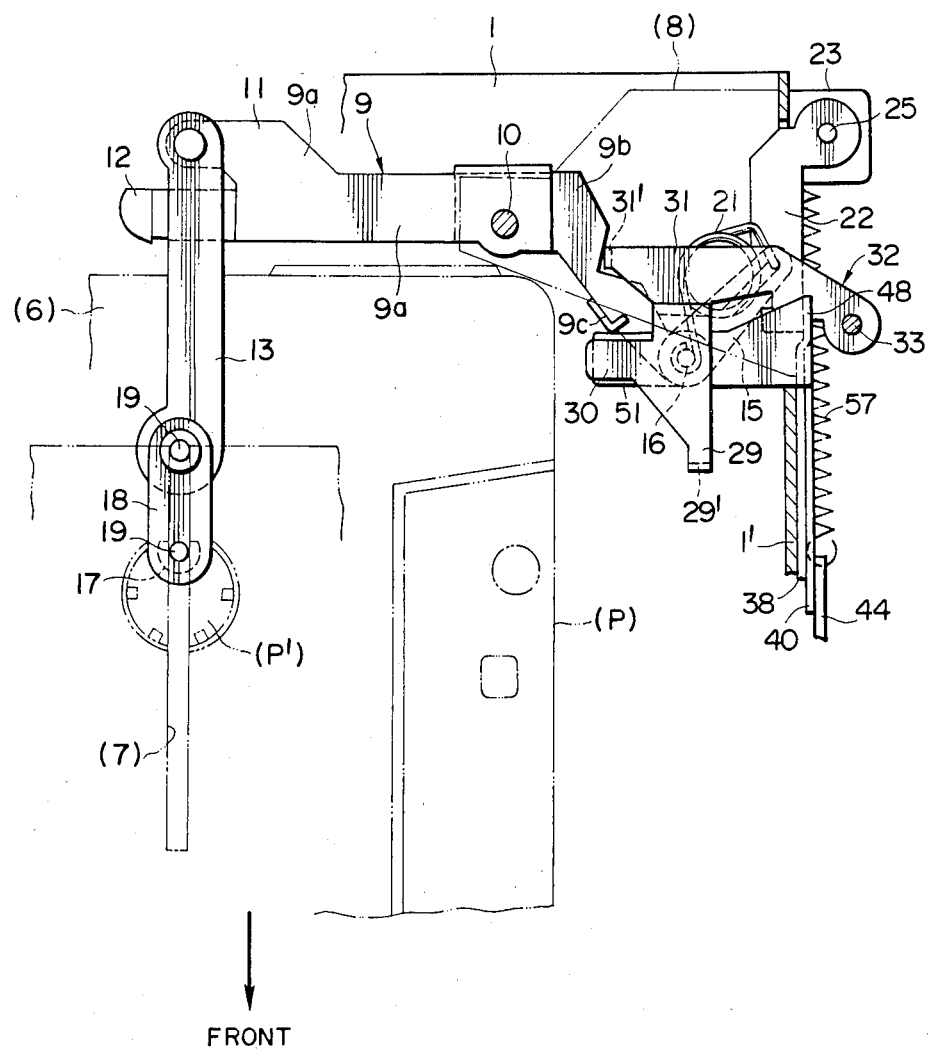
FIG. 11 is a plan view of essential parts in the play state.
Figure 14:
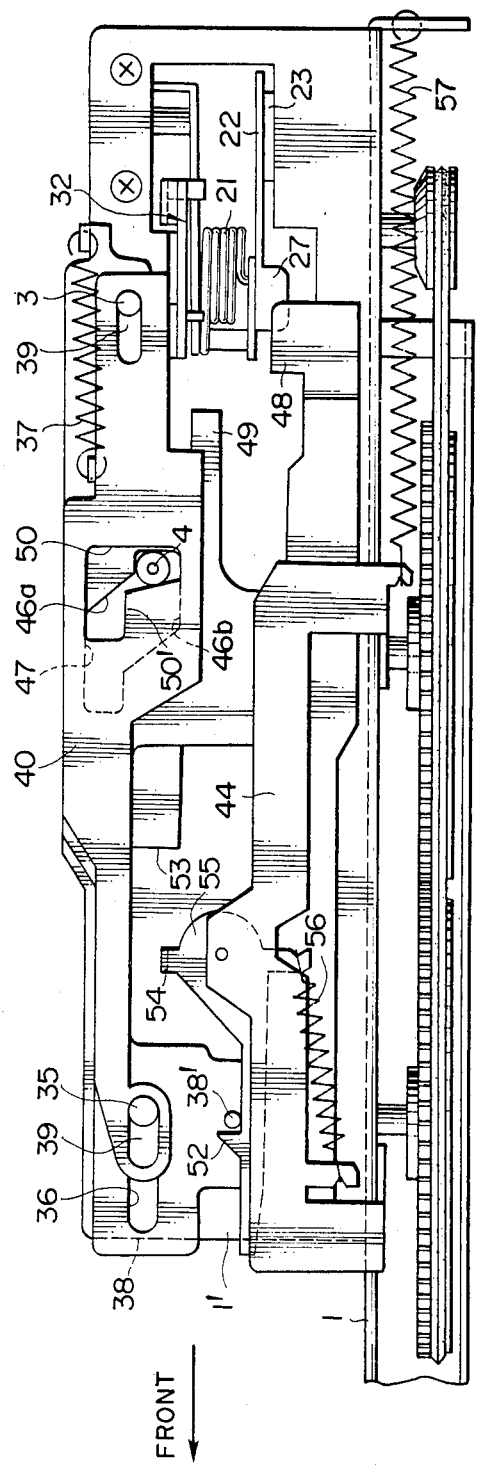
FIG. 14 is a right-hand side view of the second embodiment in the play state.

On the other hand, when the pivotal lever 9 is pivotally moved clockwise by the forceful pivotal movement of the torsion coil spring 21, a pressing member 9c erected on the other piece 9b of the lever 9 causes the projected member 30 of the actuating member 32 to be pressed to urge the actuating member 32 counterclockwise toward the second position and at the same time press the defining member 51, whereby the retaining member 40 is pressed forwardly (FIG. 12). Then, as shown in FIG. 14, the operating shaft 4 is disengaged from the horizontal edge 50' of the retaining hole 50 and the tilting frame 2 is moved downward by the downward resilient force applied by the spring 5, whereby the tilting frame 2 is tilted downwardly, and the cassette holder 6 is moved downward while maintaining the horizontal direction and assumes the play state as shown in FIGS. 11 and 14. At this time, the actuating member 32 assumes the second position.

During the aforementioned operation, a motor is driven by a switch actuated by the insertion of the cassette P, though not shown, for example, the driving member 44 is moved, against the tension of the spring 57, from the state of FIG. 8 to the front side of the player, that is, leftward in the figure to bring the pawl 52 into engagement with the projecting member 38'. In this engaging state, the driving member 44 is disengaged from the motor driving system and the driving member 44 is locked by a locking mechanism (not shown) while maintaining the aforesaid state to assume the state shown in FIG. 14.

Next, when the ejecting operation is carried out so as to eject the cassette P from the play state shown in FIGS. 11 and 14, the locking of the driving member 14 is released, and the driving member 44 and the ejecting member 38 are both moved rearwardly by the forceful spring 57 through the engagement between the pawl 52 and the projecting member 38'.

Then, the upwardly inclined edge 46b of the operating hole 47 causes the operating shaft 4 to be urged upward to upwardly tilt the tilting frame 2, thus guiding the cassette holder 6 to the non-play state.

On the other hand, the abutting member 54 of the swinging member 55 provided on the driving member 44 which is moved rearward by the spring 57 comes into abutment with the contact portion 53 of the side wall 1' of the frame, the swinging member 55 is tilted against the controlling spring 56 to disengage the pawl 52 from the projecting member 38', the driving member 44 is restored rearward, and the upwardly moved the operating shaft 4 is maintained in the upper stage position by the downwardly inclined edge 16a of the operating hole 47 on the horizontal edge 50' of the retaining hole 50 (FIG. 8). In the foregoing, the operating hole 47 provided in the ejecting member 38, the upwardly inclined edge 46b of the operating hole 47, the downwardly inclined edge 46a and the retaining hole 50 of the retaining member 40, and the horizontal edge 50' of the retaining hole 50 are principal elements constituting the aforementioned second defining portion.

Figure 13:
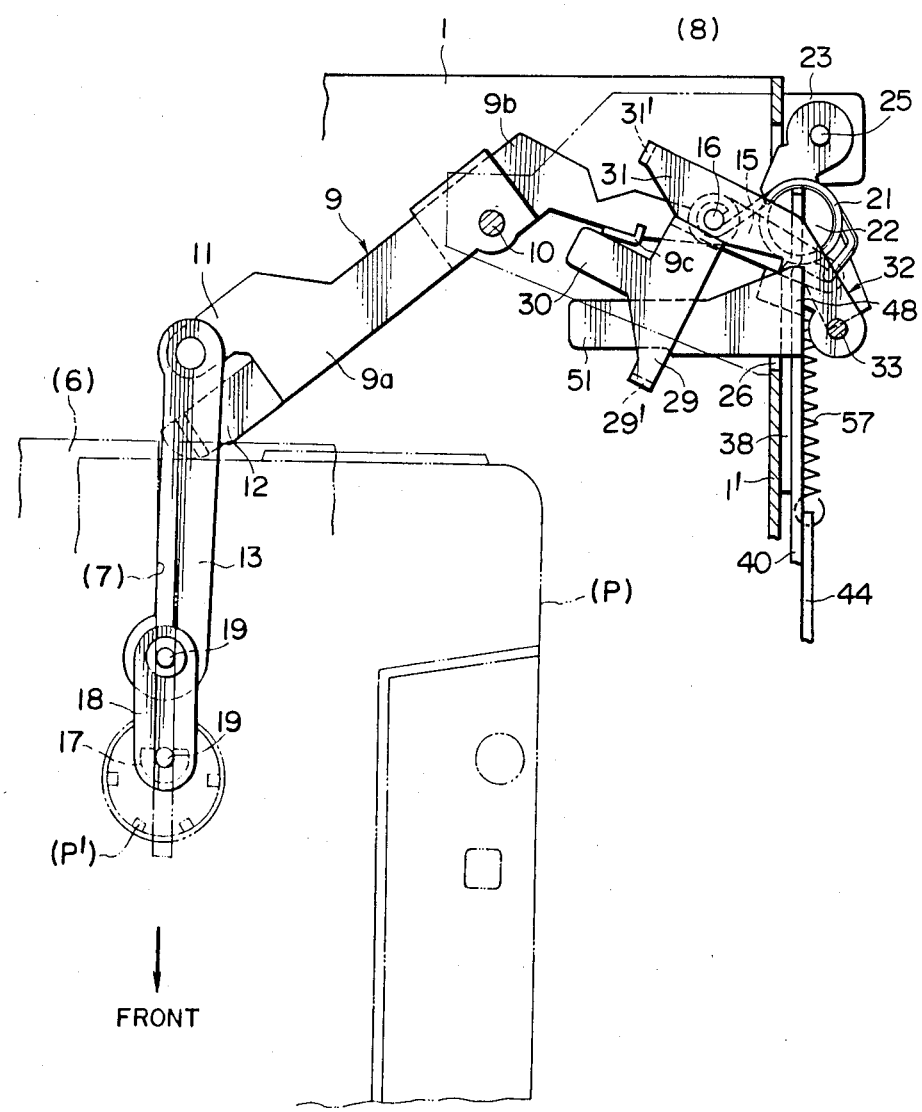

On the other hand, since the precluding member 48 is disengaged from the contact member 27 of the pivotal member 22 in response to the rearward movement of the ejecting member 38 (FIG. 8), the pivotal member 22 is pivotally moved counterclockwise in FIG. 11 by the resilient force of the torsion coil spring 21, and the spring force of the torsion coil spring 21 is released (FIG. 13).

Furthermore, as the ejecting member 38 is moved backward, the projecting member 49 extended from the rear end thereof comes into contact with the tongue 28' provided on the actuating member 32 to urge the actuating member 32 clockwise in FIG. 11. This clockwise pivotal movement causes the projecting member to press the pressing member 9c, and the pivotal lever 9 is pivotally moved counterclockwise about the pivot portion 10, whereby the cassette P within the cassette holder 6 is urged forwardly by the contact portion 12 to be ejected. Further, unnecessary backward movement of the retaining member 40 is precluded by the contact between the tongue 29' of the actuating member 32 and the defining member 51 and the contact between the tongue 31' and the other other piece 9b of the pivotal lever 9. The ejecting member 38 is moved rearward by the engagement between the pawl 52 and the projection 38' in response to the backward movement of the driving member 44 and is released from cooperation with the the driving member 44 when the abutting member 54 of the swinging member 55 abuts against the contact portion 53 of the side wall 1' of the frame to release the engagement between the pawl 52 and the projection 38', after which the ejecting member is moved backward under the action of the spring 37, and the precluding member 48 again comes into contact with the contact member 27 of the pivotal member 22 to preclude the outward movement thereof.

That is, the cassette holder 6 is returned to the upper stage position, the cassette P within the cassette holder 6 is ejected, and other mechanisms are also returned to the states shown in FIGS. 7, 8 and 10 showing the non-play state.

It is to be noted that if the ejecting member 38 is manually operated, the driving member 44 may be omitted, in which case, there are provided a mechanism by which when the cassette P is inserted into the cassette holder 6, the ejecting member 38 is guided to a position in which an ejecting operation may be made by means of the controlling spring 37, and a mechanism by which said state is locked.

What is claimed is:

1. A tape player provided with a mechanism for taking in and out a tape cassette, and tape player comprising: a pivotal lever mounted on an instrument-frame of the tape player which is pivotally moved, when a tape cassette is loaded, from an ejection position of said cassette to its loading position while being urged by said cassette; resilient means for urging said pivotal lever so that said pivot lever is pivotally moved in the direction of ejecting the tape cassette; a member mounted on one end of said pivotal lever and having an engaging shaft engageable with a reel hole of said cassette when the latter is loaded; an ejecting member operative to eject said cassette from a cassette holder which is shifted by resilient urging means from a non-play state to a play state in the ejection position of said cassette; a pivotal member positioned on the side of said instrument frame and having one end pivotally mounted horizontally pivotably, said pivotal member being precluded from pivotal movement outside said frame by said ejecting member; a torsion coil spring having opposite ends engaged with a free end of said pivotal member and with the other end of said pivotal lever, respectively; and a connecting member interposed between the opposite ends of said torsion coil spring to allow movement in the direction in which a spacing between the opposite ends of said torsion coil spring is reduced by restrict movement in the direction said spacing is broadened; whereby when the ejecting member is operated to be ejected, preclusion of pivotal movement of said pivotal member outside said instrument frame is released, and said cassette holder is pivotally shifted from the play state to the non-play state.

2. The tape player according to claim 1 further comprising a pivotal actuating member pivotally movable, when said pivotal lever is pivotally moved from said ejection position to said loading position, from a first position corresponding to said non-play state to a second position corresponding to said play position in response to said pivotal movement of said pivotal lever, pivotally movable from said second position to said first position by operation of said ejecting member, and operative to pivotally move said pivot lever from said loading position to said ejection position; a slideable retaining member for retaining said non-play state of the cassette holder which assumes the play state from the non-play state under the influence of the resilient bias; and a defining member provided on said retaining member to engage said actuating member to restrain sliding movement of said retaining member while slidably moving said retaining member so as to release the retaining state of said cassette holder when said actuating member is pivotally moved from the first position to the second position.

* * * * *